United States Patent
Wang et al.

(10) Patent No.: US 7,719,780 B2
(45) Date of Patent: May 18, 2010

(54) COLOR FILTER ARRAY AND METHOD FOR DISPLAY THEREOF

(75) Inventors: Yi-Hua Wang, Tainan County (TW); Bing-Jei Liao, Tainan County (TW)

(73) Assignee: Himax Display, Inc., Tainan County (TW)

( * ) Notice: Subject to any disclaimer, the term of this patent is extended or adjusted under 35 U.S.C. 154(b) by 278 days.

(21) Appl. No.: 11/868,422

(22) Filed: Oct. 5, 2007

(65) Prior Publication Data
US 2009/0161241 A1 Jun. 25, 2009

Related U.S. Application Data

(60) Provisional application No. 60/864,794, filed on Nov. 8, 2006.

(51) Int. Cl.
*G02B 5/22* (2006.01)
*G02F 1/1335* (2006.01)
(52) U.S. Cl. .................. 359/891; 349/106; 359/885

(58) Field of Classification Search ............ 349/106, 349/109; 359/891
See application file for complete search history.

(56) References Cited

U.S. PATENT DOCUMENTS
7,388,630 B2 * 6/2008 Shin et al. ............ 349/109

FOREIGN PATENT DOCUMENTS
CN  1836188  9/2006

* cited by examiner

*Primary Examiner*—Audrey Y Chang
(74) *Attorney, Agent, or Firm*—J.C. Patents (57) ABSTRACT

A color filter array suitable for a display panel is provided. The color filter array includes a first pixel, a second pixel, a third pixel and a forth pixel. The first pixel is consisted of a green filter, a blue filter and a transparent filter. The second pixel is consisted of a red filter, a blue filter and a transparent filter. The third pixel is consisted of a red filter, a green filter and a transparent filter. The fourth pixel is consisted of a red filter, a blue filter and a green filter. The architecture of the color filter array is able to increase the image brightness of the display panel.

9 Claims, 9 Drawing Sheets

COLOR FILTER ARRAY AND METHOD FOR DISPLAY THEREOF

CROSS-REFERENCE TO RELATED APPLICATION

This application claims the priority benefit of U.S. provisional application Ser. No. 60/864,794, filed on Nov. 8, 2006, all disclosures are incorporated therewith.

BACKGROUND OF THE INVENTION

1. Field of the Invention

The present invention generally relates to a color filter array, and more particularly, to a color filter array suitable for a display panel and a method for display panel including the same.

2. Description of Related Art

Figure 1:
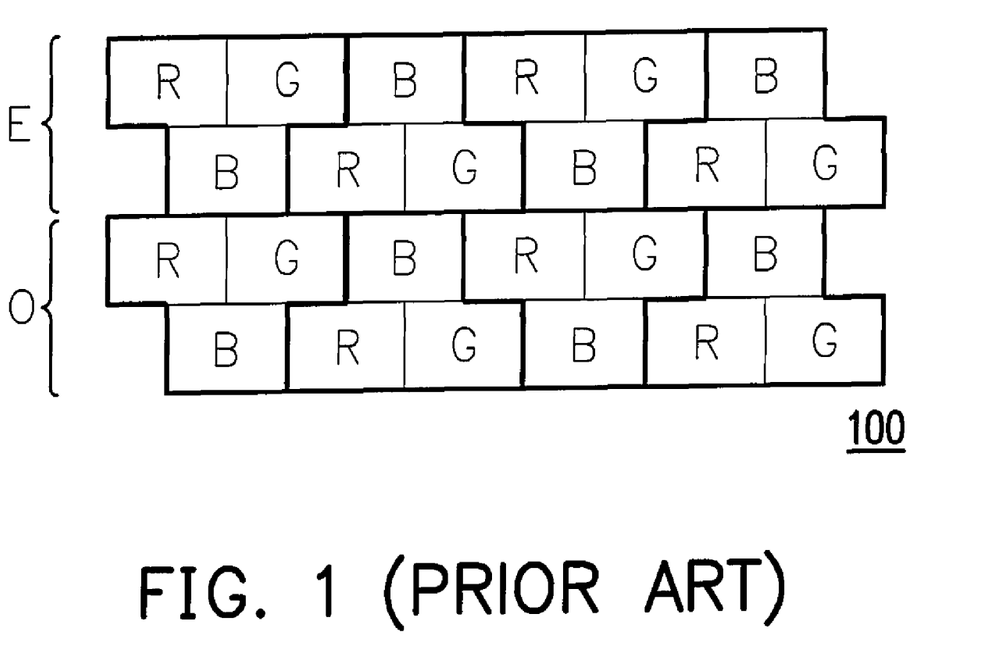
FIG. 1 is a schematic top view of color filters of a conventional silicon LCD panel.

The color filters of a traditional display panel include RGB (red, green and blue) color filters only. The three color filters are arranged in a strip mode, a delta mode or a mosaic mode. FIG. 1 is a schematic top view of the color filters of a conventional LCD panel. The color filters herein are arranged in the delta mode.

The color filter array 100 has multiple red filters R, multiple green filters G and multiple blue filters B, which are arranged along an even line E and an odd line O. One red filter R, one green filter G and one blue filter B form a pixel (as shown by a portion enclosed by bold line segments in FIG. 1). However, the display panel employing color filters is poor in light efficiency, because the red filter R blocks the green light and the blue light, the green filter G blocks the red light and the blue light, and the blue filter B blocks the red light and the green light. In other words, two thirds of light is filtered out, which results in poor light efficiency.

SUMMARY OF THE INVENTION

Accordingly, the present invention is directed to a color filter array that may be employed to solve the problem of lower image brightness.

The present invention is also directed to a display method suitable for the above-mentioned color filter array.

The present invention provides a color filter array suitable for a display panel. The color filter array includes a first pixel, a second pixel, a third pixel and a fourth pixel. The first pixel is consisted of a green filter, a blue filter and a transparent filter. The second pixel is consisted of a red filter, a blue filter and a transparent filter. The third pixel is consisted of a red filter, a green filter and a transparent filter. The fourth pixel is consisted of a red filter, a blue filter and a green filter.

The present invention also provides a display method suitable for a plurality of pixel electrodes of an LCD panel having the above-mentioned color filter array. The display method includes the following steps. First, a plurality of original pixel data is received, wherein each original pixel data includes an initial red data, an initial green data and an initial blue data. Next, the plurality of the original pixel data is converted into a plurality of converted pixel data, wherein each converted pixel data includes a plurality of color data. Next, a display set of pixel data is generated by omitting one of the color data for each converted pixel data. Next, the display panel is driven based on the display set of pixel data.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Traditionally, in order to increase image brightness, an alternative display mode, i.e., an RGBW display mode is adopted, where a pixel employs four filters to increase brightness: a red filter, a blue filter, a green filter and a transparent filter. The disadvantage thereof however is that four sub-pixels are required to display a pixel, which decreases the display resolution.

The color filter array provided according to the embodiment of the present invention is suitable for a display panel, wherein the display panel is, for example, LCOS (Liquid Crystal On Silicon) panel, LCD panel or other appropriate display panels. The color filter array includes four kinds of pixels, wherein the first pixel is consisted of a green filter, a blue filter and a transparent filter. The second pixel is consisted of a red filter, a blue filter and a transparent filter. The third pixel is consisted of a red filter, a green filter and a transparent filter. The fourth pixel is consisted of a red filter, a blue filter and a green filter.

According to the above description, each of the first pixels to the fourth pixel is consisted of three filters among the red, green, blue and transparent filters. In other words, each pixel lacks one of the red, green, blue and transparent filters. In detail, the first pixel lacks the red filter, the second pixel lacks the green filter, the third pixel lacks the blue filter, and the fourth pixel lacks the transparent filter. That is, each pixel alternately omits one of the red pixel data (R), the green pixel data (G), the blue pixel data (B) and transparent pixel data (W), so that a pixel only requires three sub-pixels to display, thereby the brightness is enhanced, due to the existence of the transparent filter, without sacrificing the resolution.

The red filters, the green filters, the blue filters and the transparent filters may be made of the same material, such as photoresistor doped with/without dye, resins or other appropriate light-transmitting materials.

According to an embodiment of the present invention, a color filter array may include a plurality of first pixels, a plurality of second pixels, a plurality of third pixels and a plurality of fourth pixels, wherein the first pixels, the second pixels, the third pixels and the fourth pixels located on a horizontal line are repeatedly arranged in a specific sequence. The embodiments of the present invention disclose six specific sequences, but are not limited to, and are illustrated as examples in the following paragraphs.

FIGS. 2A-2F are pixel arrangement diagrams of color filter arrays according to various embodiments of the present invention. Referring to FIGS. 2A-2F, '1', '2', '3' and '4' herein respectively notate the first, second, third and fourth pixels. The above-mentioned six specific sequences would be explained in detail as followed.

The number of the pixel types in the embodiment is four, therefore, there is a total of 24 specific sequences. However, considering repeated arrangement of pixels, some of the specific sequences are duplicate. In other words, the six specific sequences given by FIGS. 2A-2F would cover the rest 18 specific sequences.

Figure 2A:
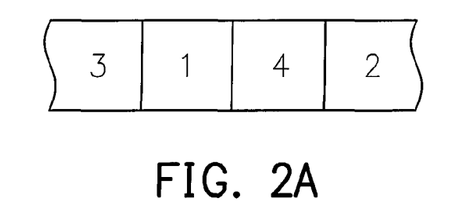
FIGS. 2A-2F are pixel arrangement diagrams of color filter arrays according to various embodiments of the present invention.

Taking FIG. 2A as an example, the specific sequence herein is 3142, based on which the sequence of repeated arrangement the first until the fourth pixels from left to right is 31423142. The specific sequence 3142 is the same as other three specific sequences: 1423, 4231 and 2314. That is to say, while the first to the fourth pixels are repeatedly arranged in the four specific sequences of 3142, 1423, 4231 and 2314, the same arrangement is resulted. Thus, the pixel arrangement sequences shown by FIG. 2A cover the four specific sequences of 3142, 1423, 4231 and 2314.

Similarly, the specific sequences shown by FIGS. 2B-2F also cover other specific sequences. In detail, the pixel arrangement sequences shown by FIG. 2B not only indicate 1234, but also cover three specific sequences of 2341, 3412 and 4123. The pixel arrangement sequences shown by FIG. 2C cover four specific sequences of 2143, 1432, 4321 and 3214. The pixel arrangement sequences shown by FIG. 2D cover four specific sequences of 1243, 2431, 4312 and 3124. The pixel arrangement sequences shown by FIG. 2E cover four specific sequences of 2413, 4132, 1324 and 3241. The pixel arrangement sequences shown by FIG. 2F cover four specific sequences of 2134, 1342, 3421 and 4213.

Note that FIGS. 2A-2F illustrate arrangements for the first to fourth pixels only, are not involved with the distributions of the red, green, blue and transparent filters, which would be explained by FIGS. 3A-3F as follows.

Figure 3A:
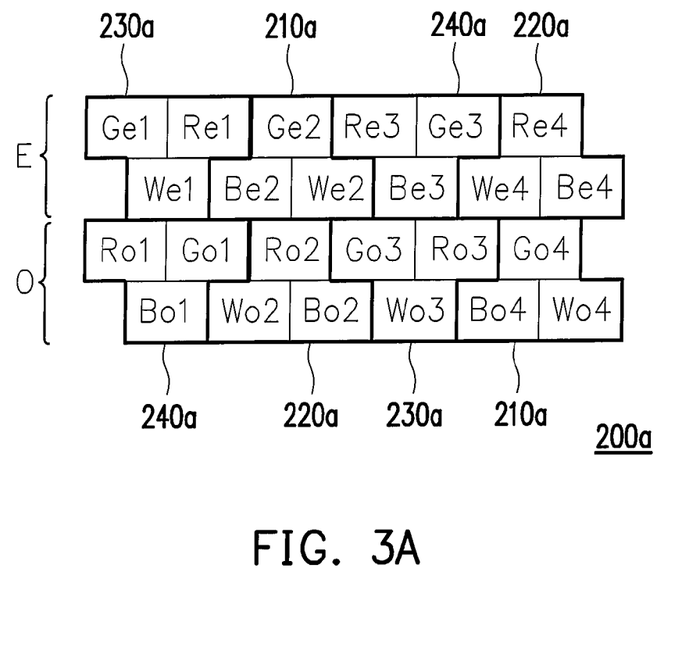
FIGS. 3A-3F are schematic top views of the color filter arrays respectively corresponding to the specific sequences of the pixel arrangements of FIGS. 2A-2F.

FIGS. 3A-3F are schematic top views of the color filter arrays respectively corresponding to the specific sequences of the pixel arrangements of FIGS. 2A-2F. Referring to FIG. 3A, a color filter array 200a includes a plurality of first pixels 210a, second pixels 220a, third pixels 230a and fourth pixel 240a, wherein the first pixels 210a, the second pixels 220a, the third pixels 230a and the fourth pixel 240a are repeatedly arranged along even lines E and odd lines O based on the specific sequence of FIG. 2A.

In detail, the specific sequence along an even line E from left to right is the third pixel 230a, the first pixel 210a, the fourth pixel 240a and the second pixel 220a, while the specific sequence along an odd line O from left to right is the fourth pixel 240a, the second pixel 220a, the third pixel 230a and the first pixel 210a. To achieve a better visual effect, the pixels (210a, 220a, 230a and 240a) are zigzag and alternately arranged along the odd line O and the even line E, respectively. In the embodiment, the specific sequence along the odd line O is the same as the even line E, but the present invention does not limit thereto.

In an embodiment of the present invention, the filters in each pixel of 210a, 220a, 230a and 240a are, for example, in a delta arrangement. In detail, on the even line E, the green filter Ge2, the blue filter Be2 and the transparent filter We2 of the first pixel 210a are in a delta arrangement; the red filter Re4, the blue filter Be4 and the transparent filter We4 of the second pixel 220a are in a delta arrangement; the red filter Re1, the green filter Ge1 and the transparent filter We1 of the third pixel 230a are in a delta arrangement; and the red filter Re3, the blue filter Be3 and the green filter Ge3 of the fourth pixel 240a are in a delta arrangement.

It can be seen from FIG. 3A, any two filters with the same color are not adjacent to each other: the multiple red filters Re1-Re4 or the multiple red filters Ro1-Ro4 of the color filter array 200a are respectively not adjacent to each other; the green filters Ge1-Ge4 or the green filters Go1-Go4 are respectively not adjacent to each other; the blue filters Be1-Be4 or the blue filters Bo1-Bo4 are respectively not adjacent to each other; and the transparent filters We1-We4 or the multiple transparent filters Wo1-Wo4 are respectively not adjacent to each other. In this way, the red filters Re1-Re4 and Ro1-Ro4, the green filters Ge1-Ge4 and Go1-Go4, the blue filters Be1-Be4 and Bo1-Bo4 and the transparent filters We1-We4 and Wo1-Wo4 are evenly distributed to ensure the image display quality.

Similarly, in the color filter arrays shown by FIGS. 3B-3F and 4, the red filters, green filters, blue filters and transparent filters are arranged in accordance with the above-mentioned rule, which ensure the image display quality and increase the image brightness without sacrificing the resolution as well.

Figure 2B:
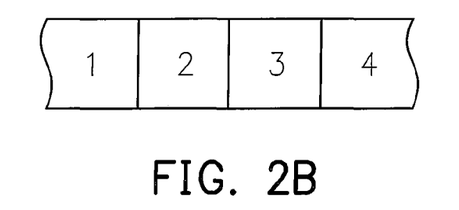
Figure 3B:
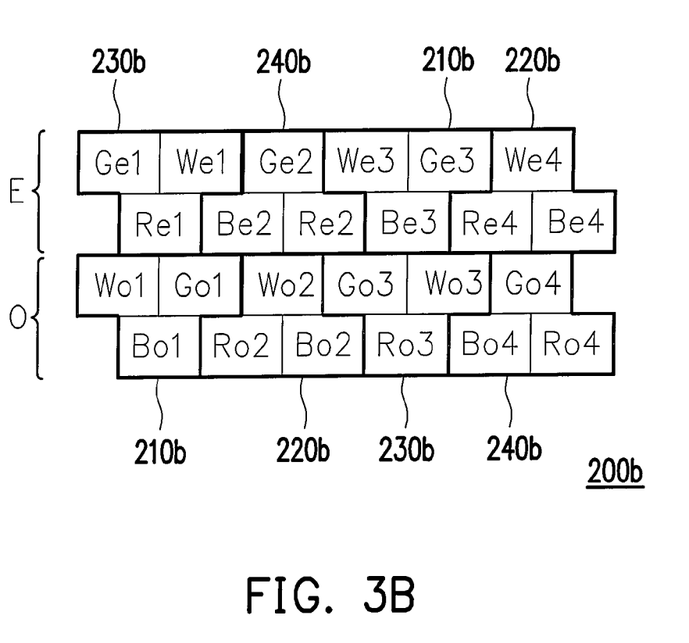

Referring to FIG. 3B, a color filter array 200b of the embodiment includes first pixels 210b, second pixels 220b, third pixels 230b and fourth pixel 240b, wherein the pixels 210b, 220b, 230b and 240b are repeatedly arranged following the specific sequence of FIG. 2B. That is, the specific sequence along an even line E and an odd line O from left to right is the first pixel 210b, the second pixel 220b, the third pixel 230b and the fourth pixel 240b. Any two filters with the same color are not adjacent to each other, so that the red filters Re1-Re4 and Ro1-Ro4, the green filters Ge1-Ge4 and Go1-Go4, the blue filters Be1-Be4 and Bo1-Bo4 and the transparent filters We1-We4 and Wo1-Wo4 are evenly distributed to ensure the image display quality and to increase the image brightness without sacrificing the resolution.

Figure 2C:
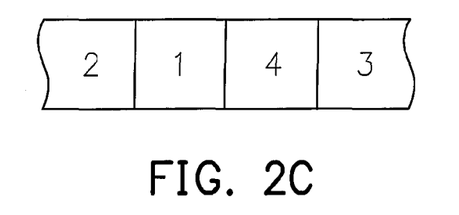
Figure 3C:
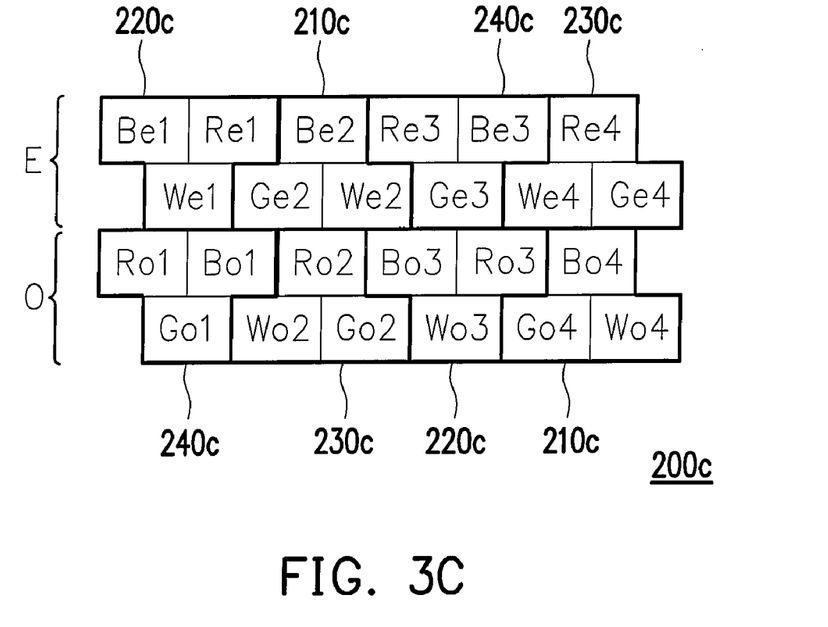

Referring to FIG. 3C, a color filter array 200c of the embodiment includes first pixels 210c, second pixels 220c, third pixels 230c and fourth pixels 240c, wherein the pixels 210c, 220c, 230c and 240c are repeatedly arranged following the specific sequence of FIG. 2C. That is, the specific sequence along an even line E and an odd line O from left to right is the second pixel 220c, the first pixel 210c, the fourth pixel 240c and the third pixel 230c.

In the embodiment, any two filters with the same color are not adjacent to each other, so that the red filters Re1-Re4 and Ro1-Ro4, the green filters Ge1-Ge4 and Go1-Go4, the blue filters Be1-Be4 and Bo1-Bo4 and the transparent filters We1-We4 and Wo1-Wo4 are evenly distributed to ensure the image display quality.

Figure 2D:
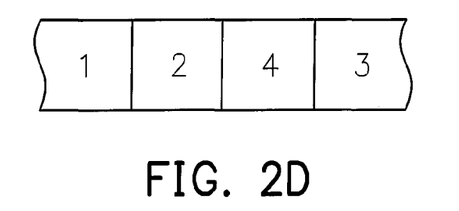
Figure 3D:
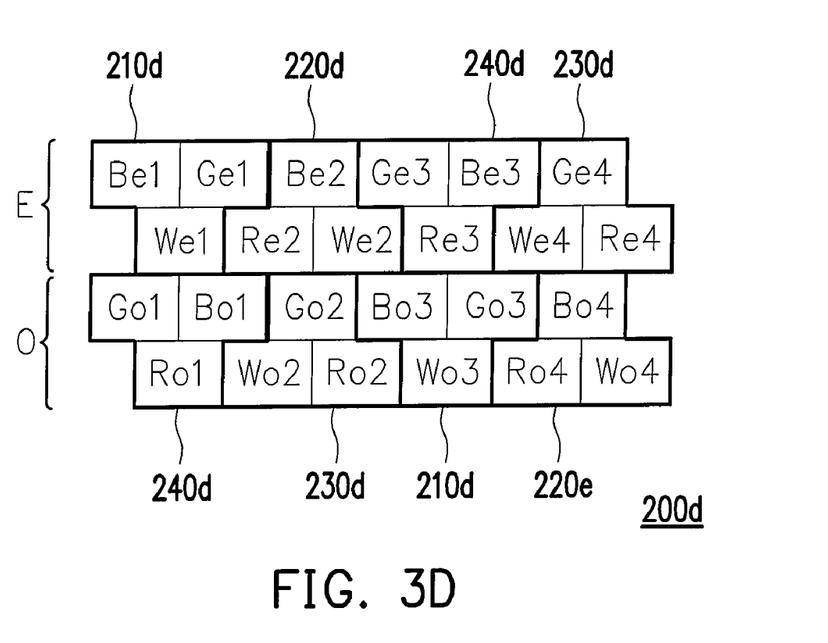

Referring to FIG. 3D, a color filter array 200d of the embodiment includes a plurality of first pixels 210d, second pixels 220d, third pixels 230d and fourth pixel 240d, wherein the pixels 210d, 220d, 230d and 240d are repeatedly arranged following the specific sequence of FIG. 2D. That is, the specific sequence along an even line E and an odd line O from left to right is the first pixel 210d, the second pixel 220d, the fourth pixel 240d and the third pixel 230d.

In the embodiment, any two filters with the same color are not adjacent to each other, so that the red filters Re1-Re4 and Ro1-Ro4, the green filters Ge1-Ge4 and Go1-Go4, the blue filters Be1-Be4 and Bo1-Bo4 and the transparent filters We1-We4 and Wo1-Wo4 are evenly distributed to ensure the image display quality and increase the image brightness without sacrificing the resolution.

Figure 2E:
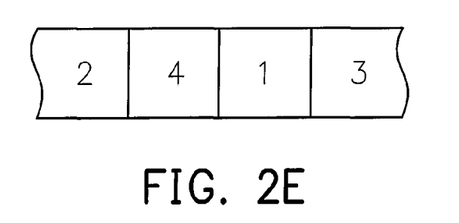
Figure 3E:
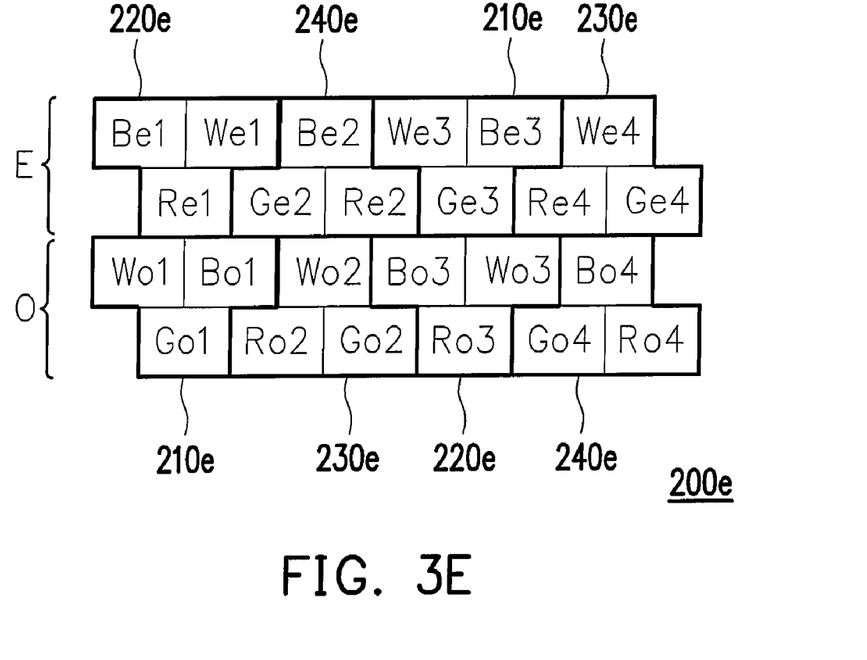

Referring to FIG. 3E, in the present embodiment, a color filter array 200e includes a plurality of first pixels 210e, a plurality of second pixels 220e, a plurality of third pixels 230e and a plurality of fourth pixel 240e, wherein the pixels 210e, 220e, 230e and 240e are repeatedly arranged following the specific sequence of FIG. 2E. That is, the specific sequence along an even line E and an odd line O from left to right is the second pixel 220e, the fourth pixel 240e, the first pixel 210e and the third pixel 230e.

Figure 2F:
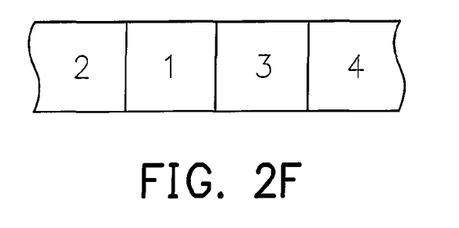
Figure 3F:
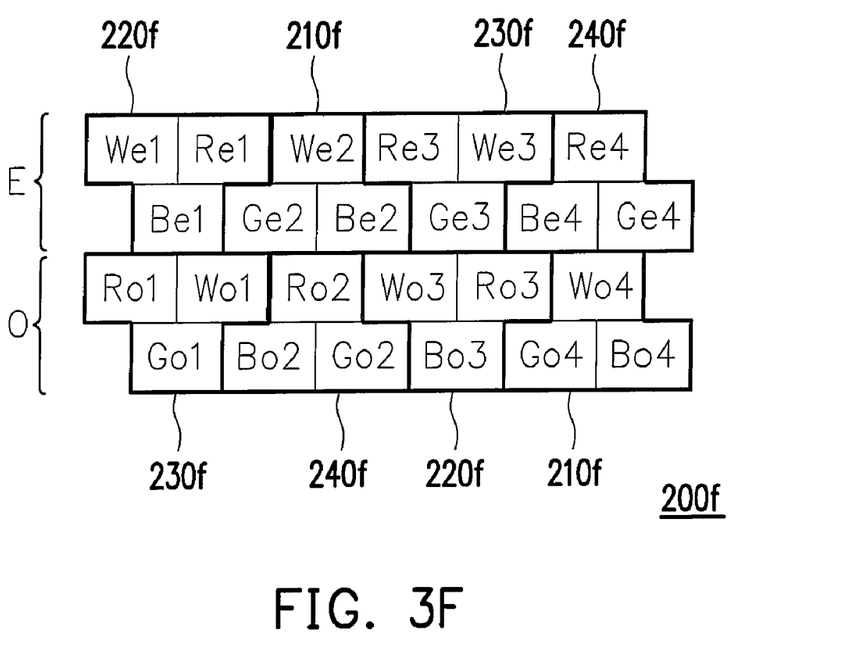

Referring to FIG. 3F, a color filter array 200f of FIG. 3F includes a plurality of first pixels 210f, a plurality of second pixels 220f, a plurality of third pixels 230f and a plurality of fourth pixels 240f, wherein the pixels 210f, 220f, 230f and 240f are repeatedly arranged following the specific sequence of FIG. 2F. That is, the specific sequence along an even line E and an odd line O from left to right is the second pixel 220f, the first pixel 210f, the third pixel 230f and the fourth pixel 240f.

Figure 4:
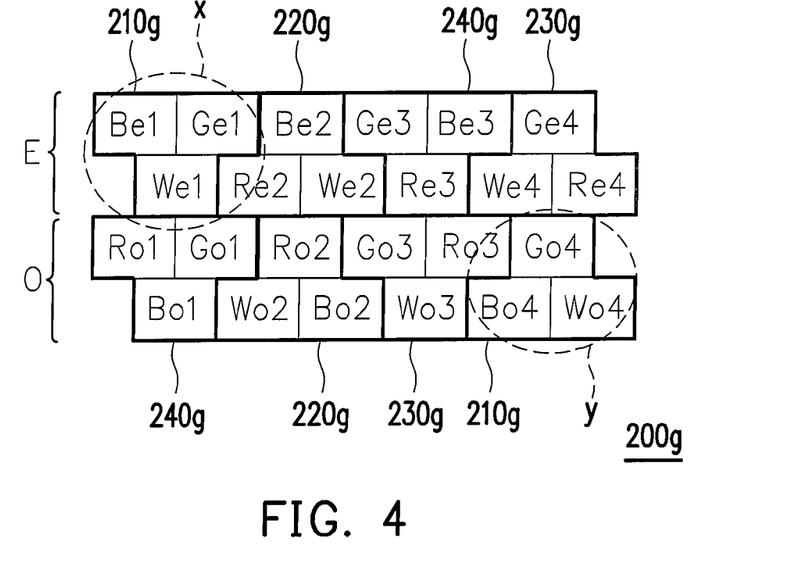
FIG. 4 is a schematic top view of a color filter array according to yet another embodiment of the present invention.

FIG. 4 is a schematic top view of a color filter array according to yet another embodiment of the present invention. Referring to FIG. 4, different from the above-described embodiments (referring to FIGS. 3A-3F) where the specific sequences for the even line E and the odd line O are the same, and in the color filter array 200g, the specific sequences for two adjacent horizontal lines (for example, the even line E and the odd line O shown by FIG. 4) are different from each other.

In detail, the specific sequence of the color filter array 200g along the even line E from left to right is the first pixel 210g, the second pixel 220g, the fourth pixel 240g and the third pixel 230g, while the specific sequence along the odd line O from left to right is the fourth pixel 240g, the second pixel 220g, the third pixel 230g and the first pixel 210g. In other words, the first pixel 210g, the second pixel 220g, the third pixel 230g and the fourth pixel 240g are repeatedly arranged differently for the even line E and the odd line O.

Note that the positions of red, green, blue and transparent filters in each pixel may be changed. Continuing to refer to FIG. 4, for example, the distributions of the filters for the first pixel 210g on the even line E (marked as X in FIG. 4) and for the first pixel 210g on the odd line O (marked as Y in FIG. 4) are different from each other. In detail, for the first pixel 210g at X, the transparent filter We1 is adjacent to the blue filter Be1 and the green filter Ge1, wherein the blue filter Be1 and the green filter Ge1 are arranged side by side; for the first pixel 210g at Y, the green filter Go4 is adjacent to the blue filter Bo4 and the transparent filter Wo4, wherein the blue filter Bo4 and the transparent filter Wo4 are arranged side by side. In short, the locations of multiple filters within each of the first pixels 210g are changeable as long as the filters with the same color are not adjacent to each other. Thus, the even distribution for each color can be achieved to ensure the image display quality.

Based on the same reason, for each pixel of FIGS. 3A-3F, the positions of multiple filters in a single pixel can be changed. Furthermore, the disposing positions of the red, green, blue and transparent filters in FIGS. 3A-3F and 4 are suitable for each pixel with various arrangement sequences shown by FIGS. 2A-2F.

Figure 5:
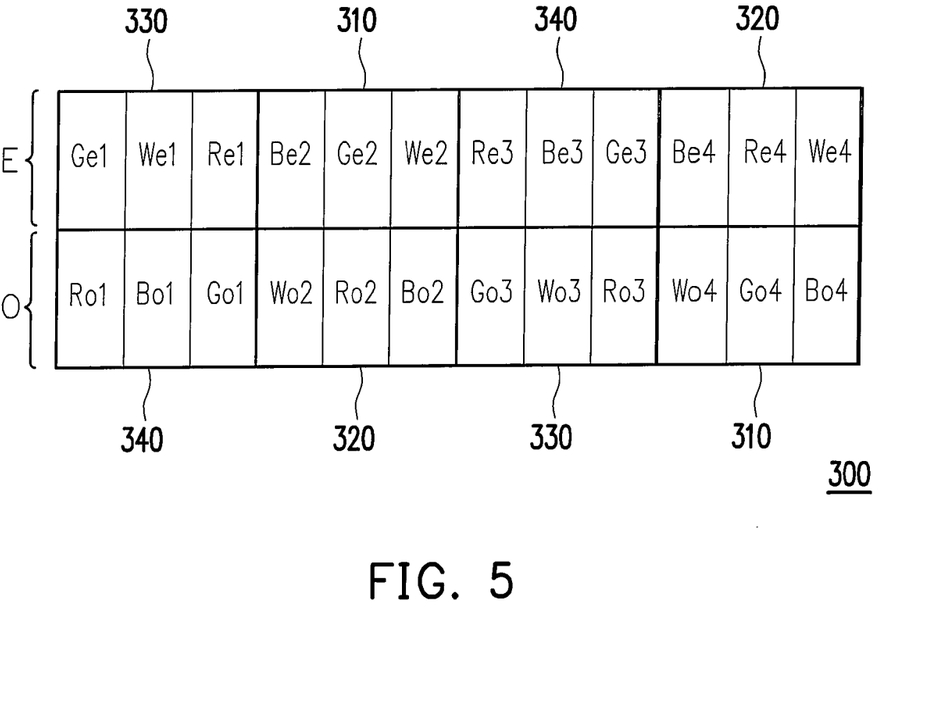
FIG. 5 is a schematic top view of a color filter array according to yet another embodiment of the present invention.

FIG. 5 is a schematic top view of a color filter array according to yet another embodiment of the present invention. Referring to FIG. 5, a color filter array 300 of the present embodiment includes a plurality of first pixels 310, a plurality of second pixels 320, a plurality of third pixels 330 and a plurality of fourth pixel 340. Differently from the above-described embodiments, the green filters Ge2 and Go4, the blue filters Be2 and Bo4 and the transparent filters We2 and Wo4 of the first pixels 310 are in a strip arrangement.

In addition, the first pixels 310, the second pixels 320, the third pixels 330 and the fourth pixels 340 in the color filter array 300 can adopt the specific sequences shown by FIGS. 2A-2F as well, which makes the filters with the same color not adjacent to each other to ensure the image display quality.

Although the filters of the above-mentioned pixels are described to be arranged in a delta arrangement or a strip arrangement, however those skilled in the art may arrange the filters of the pixels in a mosaic arrangement or some other arrangements to achieve the purpose of the present invention, which shall also be construed to be within the scope of the present invention.

Figure 6A:
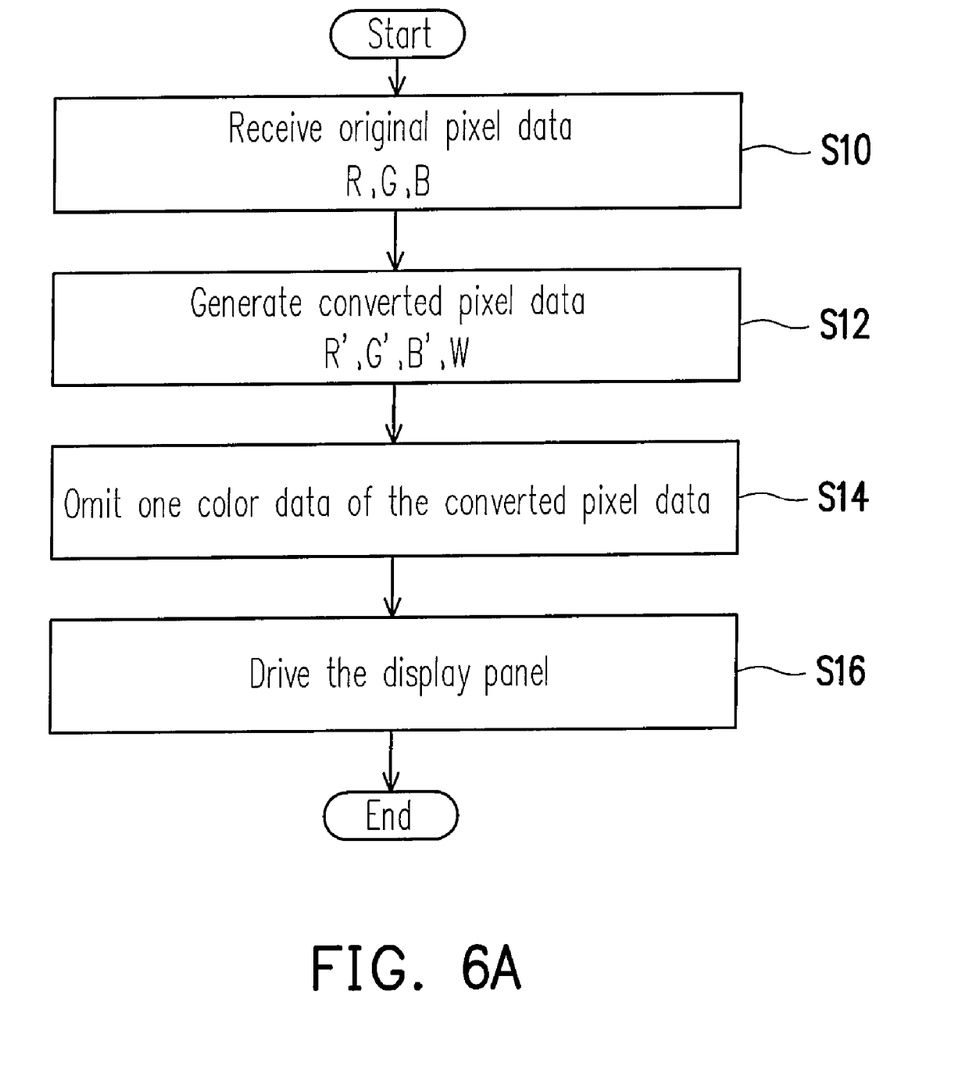
FIG. 6A is a flowchart of a first method for driving a display including the color filter array according to an embodiment of the present invention.
Figure 7:
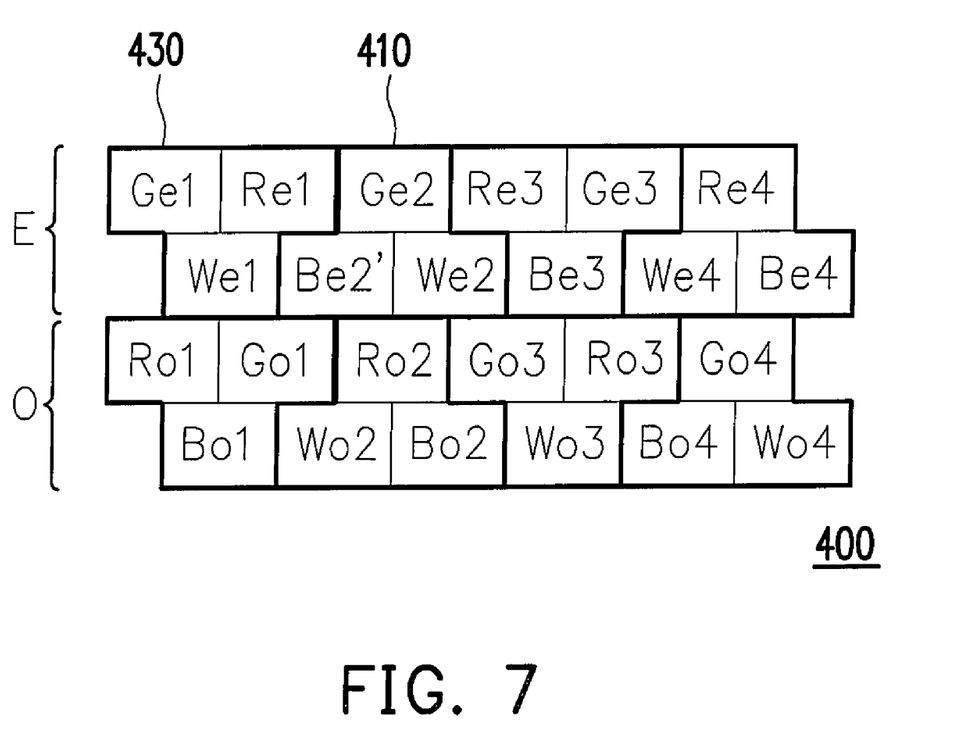
FIG. 7 is a schematic top view of a color filter array for exemplarily illustrating the display methods of FIGS. 6A and 6B.

FIG. 6A is a flowchart of the first method for driving a display including the color filter array according to an embodiment of the present invention, and FIG. 7 is a schematic top view of a color filter array for exemplarily illustrating the display method shown in FIG. 6A. Referring to FIGS. 6A and 7, the display method of the present invention is exemplarily explained by FIGS. 6A and 7.

The display method shown in FIG. 6A for driving the display is not only applicable to the color filter array 400 shown in FIG. 7, but also to the display panels employing the color filter arrays 200a-200g and 300 shown in FIGS. 3A-3F, 4 and 5.

The display method for driving the display according to the present embodiment includes the following steps. First, a plurality of original pixel data are received from a video source (step S10), wherein each original pixel data includes an initial red data R, an initial green data G and an initial blue data B.

Next, a plurality of converted pixel data are generated according to the original pixel data (step S12), wherein each converted pixel data includes a plurality of color data, for example, red data R', green data G', blue data B' and luminance data W. One of the algorithms thereof is, for example, W=min(R, G, B); R'=R−W; G'=G−W; B'=B−W. There are many other algorithms to convert original pixel data into R'G'B'W pixel data, for simplicity they are omitted herein.

Next, one color data of the converted pixel is omitted (step S14) so as to generate a display set of pixel data. In detail, taking the third pixel 430 and the adjacent first pixel 410 on the even line E of FIG. 7 as an example, since the third pixel 430 is short of the blue filter, thus, the blue data B'(1) needs to be omitted; similarly, the first pixel 410 is short of the red filter, accordingly, the red data R'(2) needs to be omitted.

Furthermore, the pixel data are output to the display panel for the corresponding pixels to drive the display panel (step S16) based on the display set of pixel data. The pixel data output to the third pixel 430 herein are red data R'(1), green data G'(1) and luminance data W(1); the pixel data output to the first pixel 410 are green data G'(2), blue data B'(2) and luminance data W(2).

Figure 6B:
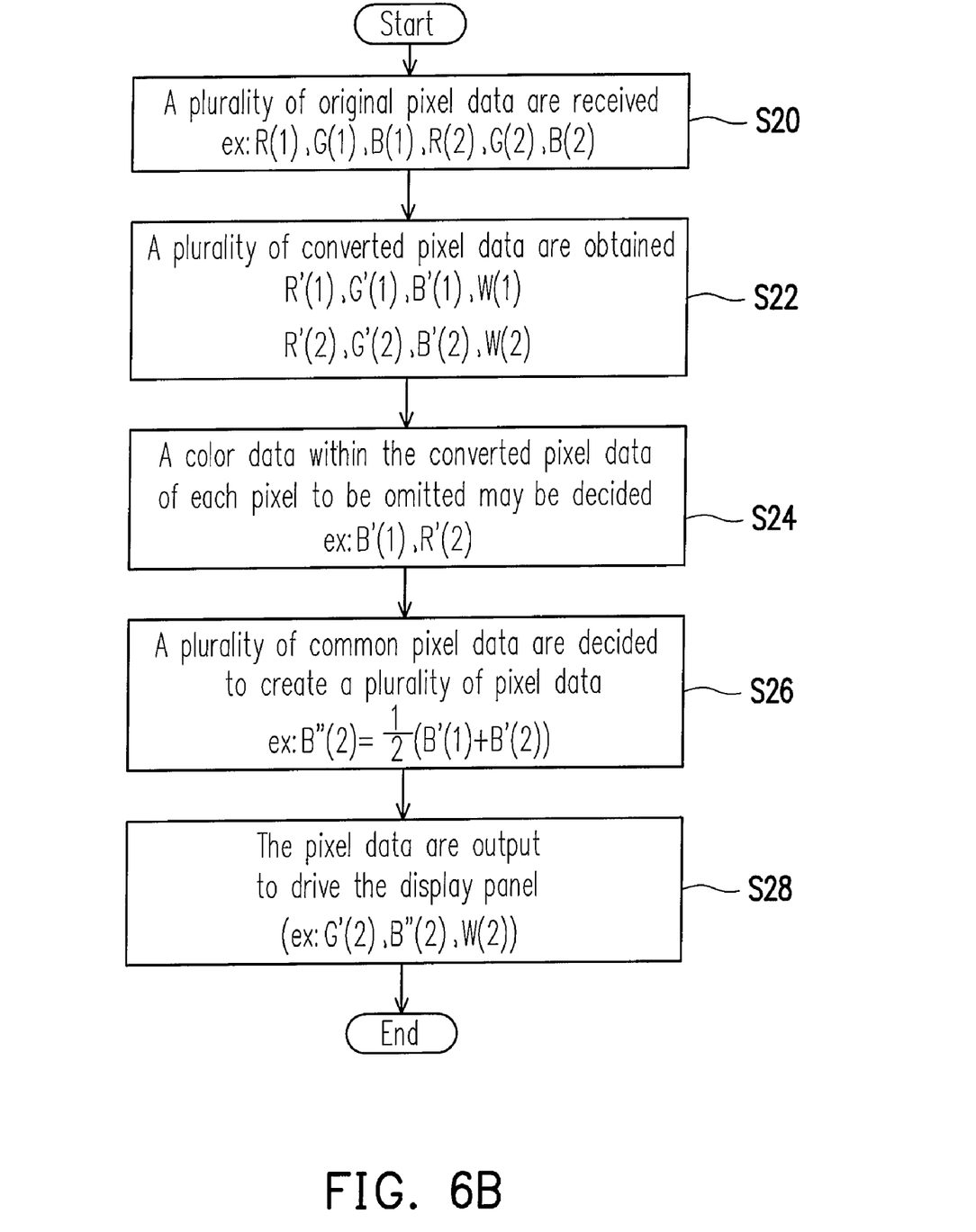
FIG. 6B is a flowchart of a second method for driving a display including the color filter array according to an embodiment of the present invention.

FIG. 6B is a flowchart of a second method for driving a display including the color filter array according to an embodiment of the present invention, and FIG. 7 is also a schematic top view of a color filter array for exemplarily illustrating the display method shown in FIG. 6B. Referring to FIGS. 6B and 7, the display method shown in FIG. 6B may be exemplarily explained hereinafter.

Similarly to of FIG. 6A, the method for display shown in FIG. 6B is not only applicable to the color filter array 400 shown by FIG. 7, but also to the display panels employing the color filter arrays 200a-200g and 300 in FIGS. 3A-3F, 4 and 5.

The method for display according to the present embodiment includes following steps. First, a plurality of original pixel data are received from a video source (step S20), wherein each original pixel data includes an initial red data R, an initial green data G and an initial blue data B. Taking the third pixel 430 and the adjacent first pixel 410 on the even line E of FIG. 7 as an example, the original pixel data received by the third pixel 430 includes an initial red data R(1), an initial blue data B(1) and an initial green data G(1), while the original pixel data received by the first pixel 410 includes an initial red data R(2), an initial blue data B(2) and an initial green data G(2).

Next, a plurality of converted pixel data are obtained according to the original pixel data (step S22), wherein each converted pixel data includes a plurality of color data, for example, red data R', green data G', blue data B' and luminance data W. For example, a red data R'(1), a green data G'(1), a blue data B'(1) and a luminance data W(1) are obtained for the third pixel 430; a red data R'(2), a green data G'(2), a blue data B'(2) and a luminance data W'(2) are obtained for the first pixel 410. To convert original pixel data into R'G'B'W, the algorithm disclosed by the above-described embodiment of FIG. 6A or other various algorithms can be used, and they are omitted to describe herein.

Next, a color data within the converted pixel data of each pixel to be omitted may be decided (step S24). For example, the third pixel 430 in FIG. 7 is short of the blue filter, thus, the blue data B'(1) needs to be omitted; similarly, the first pixel 410 is short of the red filter, accordingly, the red data R'(2) needs to be omitted.

Furthermore, a plurality of common pixel data are decided (step S26) to create a plurality of pixel data. In detail, taking the third pixel 430 and the first pixel 410 on the even line E of FIG. 7 as an example, since the third pixel 430 is short of the blue filter, thus, the blue filter Be'(2) of the first pixel 410 is shared with the third pixel 430 and the first pixel 410 for common use. Therefore, the blue filter Be'(2) of the first pixel 410 must be converted into a common blue data B"(2) by using the algorithm: B"(2)=(B'(1)+B'(2))×1/2. The algorithm means each common color data is an average of the omitted color data of one converted pixel data and a corresponding color data of another adjacent converted pixel data. Another algorithm to obtain common color data is: B"(2)=C1×B'(1)+ C2×B'(2), wherein C1 and C2 are coefficients larger than 0 but smaller than or equal to 1. There are other different algorithms to obtain common color data, and they are omitted to describe herein.

Furthermore, the pixel data are output to the display panel for the corresponding pixels to drive the display panel (step S28). For example, the pixel data output to the third pixel 430 herein are red data R'(1), green data G'(1) and luminance data W(1); the pixel data output to the first pixel 410 are green data G'(2), blue data B'(2) and luminance data W(2). In this way, images with good color quality are produced.

In summary, since the color filter array, according to various embodiments of the present invention described above, employs transparent filters, there is no need to increase light source luminance for increasing the image brightness. In addition, the first pixel, the second pixel, the third pixel and the fourth pixel are different from each other and respectively consisted of three filters among the red filter, the green filter, the blue filter and the transparent filter. Within all the pixels, any two filters having the same color (red, green, blue and transparent) are not adjacent to each other, and the red filters, the green filters, the blue filters and the transparent filters are distributed evenly, so as to keep the image in good quality. Therefore, the color filter array, according to various embodiments of the present invention described above, is able to increase the image brightness without lowering the image resolution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A color filter array, suitable for a display panel, comprising:
   a plurality of first pixels, each first pixel is consisted of a green filter, a blue filter and a transparent filter;
   a plurality of second pixels, each second pixel is consisted of a red filter, a blue filter and a transparent filter;
   a plurality of third pixels, each third pixel is consisted of a red filter, a green filter and a transparent filter; and
   a plurality of fourth pixels, each fourth pixel is consisted of a red filter, a blue filter and a green filter, wherein the first pixels, the second pixels, the third pixels and the fourth pixels on the same horizontal line are repeatedly arranged in a specific sequence, the specific sequence is a first sequence, a second sequence, a third sequence, a fourth sequence, a fifth sequence or a sixth sequence,
   the first sequence from left to right is sequentially the first pixel, the second pixel, the third pixel and the fourth pixel,
   the second sequence from left to right is sequentially the second pixel, the first pixel, the third pixel and the fourth pixel,
   the third sequence from left to right is sequentially the second pixel, the fourth pixel, the first pixel and the third pixel,
   the fourth sequence from left to right is sequentially the second pixel, the first pixel, the fourth pixel and the third pixel,
   the fifth sequence from left to right is sequentially the third pixel, the first pixel, the fourth pixel and the second pixel, and
   the sixth sequence from left to right is sequentially the first pixel, the second pixel, the fourth pixel and the third pixel.

2. The color filter array according to claim 1, wherein the red filters of the second pixels, the third pixels and the fourth pixels are not adjacent to each other; the green filters of the first pixels, the third pixels and the fourth pixels are not adjacent to each other; the blue filters of the first pixels, the second pixels and the fourth pixels are not adjacent to each other; and the transparent filters of the first pixels, the second pixels and the third pixels are not adjacent to each other.

3. The color filter array according to claim 1, wherein the specific sequence respectively corresponding to two adjacent horizontal lines are not the same.

4. The color filter array according to claim 1, wherein the green filter, the blue filter and the transparent filter of each first pixel are in a delta arrangement, the red filter, the blue filter and the transparent filter of each second pixel are in a delta arrangement, the red filter, the green filter and the transparent filter of each third pixel are in a delta arrangement, and the red filter, the blue filter and the green filter of each fourth pixel are in a delta arrangement.

5. The color filter array according to claim 4, wherein the green filter of each first pixel is adjacent to the blue filter and to the transparent filter, and the blue filter and the transparent filter of each first pixel are arranged side by side; the red filter of each second pixel is adjacent to the transparent filter and to the blue filter, and the transparent filter and the blue filter of each second pixel are arranged side by side; the transparent filter of each third pixel is adjacent to the green filter and to the red filter, and the green filter and the red filter of each third pixel are arranged side by side; the blue filter of each fourth pixel is adjacent to the green filter and to the red filter, and the green filter and the red filter of each fourth pixel are arranged side by side.

6. The color filter array according to claim 1, wherein the green filter, the blue filter and the transparent filter of each first pixel are in a strip arrangement, the red filter, the blue filter and the transparent filter of each second pixel are in a strip arrangement, the red filter, the green filter and the transparent filter of each third pixel are in a strip arrangement and the red filter, the blue filter and the green filter of each fourth pixel are in a strip arrangement.

7. A method for display, suitable for a plurality of pixel electrodes of a display panel, the display panel having the color filter array according to claim 1, the method comprising:

receiving a plurality of original pixel data, wherein each original pixel data comprises an initial red data, an initial green data and an initial blue data;

converting the plurality of the original pixel data respectively into a plurality of converted pixel data, wherein each converted pixel data comprises a plurality of color data;

generating a display set of pixel data by omitting one of the color data for each converted pixel data and determining a common pixel data after omitting one of color data for each converted pixel data, wherein each of the common color data is obtained based on the omitted color data of one converted pixel data and a corresponding color data of another adjacent converted pixel data; and driving the display panel based on the display set of pixel data.

8. The method for display according to claim 7, wherein the color data of each converted pixel data are a red data, a green data, a blue data and a luminance data.

9. The method according to claim 7, wherein each of the common color data is an average of the omitted color data of one converted pixel data and a corresponding color data of another adjacent converted pixel data.

* * * * *